United States Patent [19]
Folsom

[11] Patent Number: 4,981,343
[45] Date of Patent: Jan. 1, 1991

[54] FOCUSING MIRROR LENS

[75] Inventor: Mark Folsom, Hollister, Calif.

[73] Assignee: Whittaker Ordnance, Inc., Hollister, Calif.

[21] Appl. No.: 306,119

[22] Filed: Feb. 6, 1989

[51] Int. Cl.$^5$ .............................................. G02B 17/00
[52] U.S. Cl. ..................................... 350/444; 350/443
[58] Field of Search ............... 350/442, 443, 444, 445, 350/446

[56] References Cited

U.S. PATENT DOCUMENTS 4,439,020  3/1984  Maruko ........................... 350/443 X Primary Examiner—Scott J. Sugarman
Attorney, Agent, or Firm—Donald E. Nist

[57] ABSTRACT

The improved focusing mirror lens reduces the ellipticity of the output beam of a laser diode or the like light source and corrects astigmatism of the beam so that beam light can be focused to a fine point. The lens has a monolithic, transparent, preferably cylindrical lens body of glass or the like, upon the opposite entrance and exit ends of which are coated focusing mirrors. At least one of the mirrors, and preferably both, has the configuration of a segment of a circular cylinder. The other mirror may have the configuration of a segment of a circular cylinder or of a sphere. The axes of the mirrors, when both are segments of a cylinder, are perpendicular to each other. Each of the mirrors has a light-transmitting unmirrored pupil aligned along the longitudinal axis of the lens body. When light passes through the entrance pupil, it passes through the lens body, is focused in a given orientation by the exit mirror and reflected back to the entrance mirror where it is again focused in an orientation perpendicular to the first orientation and is reflected toward and out the exit pupil. The lens allows efficient coupling of laser diodes to optical fibers and has other applications.

10 Claims, 1 Drawing Sheet

FOCUSING MIRROR LENS

PRIOR ART STATEMENT

No prior art search has been made on the subject matter of the present invention. Graded index rod lenses can image a laser diode—originated light as can the present lens, but cannot remove astigmatism or ellipticity from the light beam, as can the present lens. Moreover, hermetic glass-to-metal sealing to a graded index rod lens is likely to destroy its focusing property, so that the utility of such lenses is limited. The improved lens of the present invention is not subject to such degradation and is improved and distinct structurally and functionally from graded index rod lenses. Accordingly, the present lens is believed to be patentable.

BACKGROUND OF THE INVENTION

1. Field of the Invention

The present invention generally relates to lenses and more particularly to a focusing lens of a new type.

2. Prior Art

Graded index rod lenses can be used to focus the output of a laser diode to an elliptical spot. A graded index rod lens also can be used to efficiently couple a laser diode to an optical fiber if the divergence angle that the fiber can accept is as great as the maximum divergence angle of the output beam of the diode. Spherical ball lenses can achieve the same functional result as graded index rod lenses. Multiple cylindrical lenses, arranged in combination, can perform similarly. In some cases, however, lenses are omitted and optical fibers are simply placed near the emitting surface of the diode in a way that allows a substantial portion of the light to be captured by the fiber core.

Graded index lenses cannot make the light beam from a laser diode more circular without discarding a large fraction of the light, and they cannot remove the astigmatism from an astigmatic beam. If the lens images essentially all of the light from the diode, the maximum divergence angle of its output beam will be approximately the same as that of the diode and it will therefore be no more compatible with an optical fiber of low numerical aperture than the unfocused output of the diode is. Moreover, hermetic glass-to-metal sealing to a graded index lens, as is required in some sealed systems, will likely destroy its focusing property, because the high temperature used in fusing the solder glass will activate diffusion between zones of differing refractive index within the lens material and from the sealing glass into the glass of the lens and change the refractive index gradient of the lens.

Spherical ball lens systems require that multiple components be assembled to make up the focusing system and the results are no better than with the graded index rod lens. They cannot easily be sealed into the diode package. Cylindrical lenses also require assembly of multiple components and are not easily built into the diode package or hermetically sealed.

Accordingly, there is a need for an improved type of lens which can focus light from an astigmatic laser diode in an improved manner.

Preferably, the lens should be produced as a single piece of material requiring no assembly to perform its function. It should focus the light from an astigmatic laser diode to a very small spot and make highly elliptical beams less elliptical. The maximum divergence angle for the output beam should be smaller than that of the input beam for highly elliptical beams, resulting in more efficient coupling to fibers of small numerical aperture. The lens should be compact and simple. The optical system required to fully correct and focus the output of a laser diode should be capable of being made very compact, simple and efficient with the use of the lens. The lens should be capable of being hermetically sealed to a diode package using solder glass. The index of refraction of the material near the lateral surface should have little or no effect on the performance of the lens.

SUMMARY OF THE INVENTION

The improved focusing lens of the present invention satisfies all the foregoing needs. The lens is a monolithic lens bearing integral mirrors at opposite ends thereof. The lens is substantially as set forth in the Abstract of the Disclosure.

The lens comprises a transparent, preferably cylindrical lens body of glass, plastic, corundum or the like, with the opposite entrance and exit ends thereof coated with a mirror coating and specially configured so that at least one of the resulting mirrors has the shape of a segment of a circular cylinder, while the other mirror has the configuration of segment of either a circular cylinder or a sphere or the like. When both mirrors have the configuration of a segment of a circular cylinder, their axes are perpendicular to each other.

The mirrors define central light-transmitting pupils aligned along the longitudinal axis of the lens body. The pupils are either uncoated or covered with a protective antireflective coating of, for example, magnesium fluoride. A beam of light passing through the entrance pupil, as from a laser diode source, travels through the lens body to the exit mirror, is partly focused, that is only in directions perpendicular to the cylindrical axis of that mirror, and is reflected back to the entrance mirror where it is focused only in directions perpendicular to that mirror's axis, then reflected back to the exit pupil as a refocused concentrated light beam.

When one of the mirrors is a segment of a sphere, a large effect can be provided by the lens with respect to astigmatism, but with a smaller change in beam cross-section shape than with the lens which bears mirrors both of which are segments of cylinders.

In one preferred embodiment, the lens body is non-cylindrical but, instead, is square in cross-section, still bearing, however, the two mirrors in the configuration of segments of circular cylinders with their axes perpendicular to each other.

The lens of the present invention reduces light beam ellipticity and astigmatism so that efficient coupling can be made between laser diodes and optical fibers. Focusing to a small bright nearly circular light spot by means of the lens improves use of light for information storage and retrieval. Moreover, the lens is not subject to degradation during sealing into the output opening of a container having a laser diode.

Further features of the present invention are set forth in the following detailed description and accompanying drawings.

DRAWINGS

DETAILED DESCRIPTION

FIGS. 1-5

Figure 1:
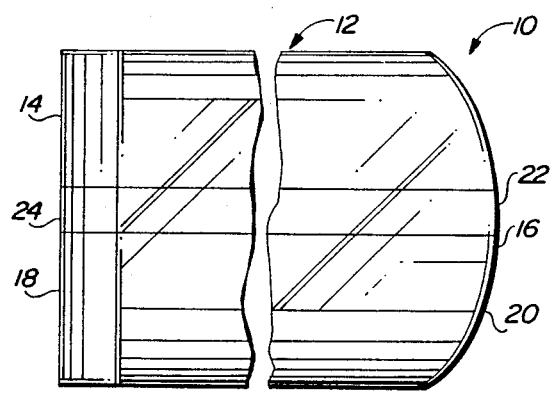
FIG. 1 is a schematic fragmentary side elevation of a first preferred embodiment of the improved focusing mirror lens of the present invention.
Figure 2:
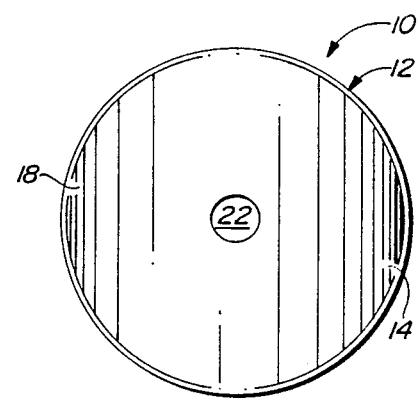
FIG. 2 is a schematic entrance end view of the lens of FIG. 1.
Figure 3:
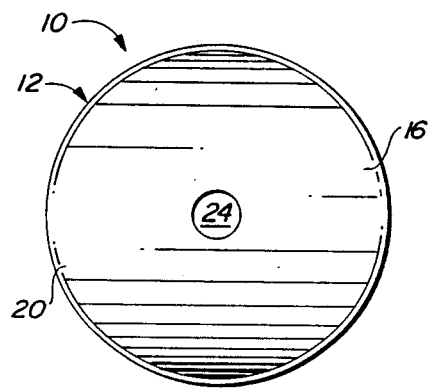
FIG. 3 is a schematic exit end view of the lens of FIG. 1.

A first preferred embodiment of the improved focusing lens of the present invention is schematically depicted in FIGS. 1-5. Thus, lens 10 is shown, which comprises a transparent generally cylindrical monolithic body 12 of glass, plastic, corundum or the like which can be formed of a single uniform piece of material. Corundum is preferred because of its very high thermal conductivety which helps carry waste heat away from a laser diode light source. Body 12 has an entrance end 14 and an opposite exit end 16. Both of ends 14 & 16 are coated to form integral mirrors 18 & 20, respectively. Thus, ends 14 & 16 can be coated with reflective silver or the like conventional mirroring material. Preferably, when a laser or laser diode is the light source, mirrors 18 and 20 are formed by depositing sequentially a stack of clear layers of a dielectric material such as magnesium fluoride and magnesium oxide, lead fluoride and cryolite, the layers having differing refractive indices, each layer's thickness being a precise multiple of the radiation to be reflected so that mirrors 18 and 20 can substantially totally reflect the output wavelength of the diode. The reflection is made nearly perfect because of constructive interference among the waves as reflected from the successive interfaces between the layers. Reflectances of more than 99% are usually achieved.

Ends 14 & 16 each have the configuration of a segment of a circular cylinder. The two segments have axes perpendicular to each other so that mirrors 18 & 20 are correspondingly so shaped and oriented. Mirrors 18 & 20 define central light-transmitting entrance and exit pupils 22 and 24, respectively, aligned along the longitudinal axis of lens body 12. Pupils 22 and 24 are either uncoated, or are covered with a coating of protective material, such as magnesium fluoride.

Figure 4:
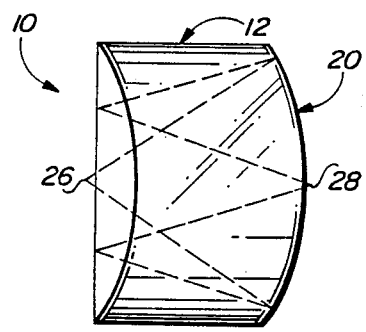
FIG. 4 is a schematic side perspective illustrating the path of two light beams from the entrance mirror pupil to the exit mirror of the lens of FIG. 1, their focusing and reflection from the exit mirror back to the entrance mirror, and their refocusing and subsequent reflection back to the exit mirror pupil.

When light is passed from a source, such as a laser diode (not shown), through entrance pupil 22, it passes through the length of lens body 12 to mirror 20 which reflects and focuses it in the manner shown by the dotted lines in FIG. 4, but does not focus it at all in the direction perpendicular to the plane of FIG. 4. The reflected light is passed back to and reflected off of mirror 18 which focuses it in the manner shown by the dotted lines in FIG. 5, but does not focus it in a direction perpendicular to the plane of FIG. 5.

Thus, each of the mirrors 18 & 20 has a focusing effect only in the directions perpendicular to its cylindrical axis. The beam of light travels about half as far from the source, indicated by the numeral 26, to the focusing surface 20 as it does from there to the image point indicated by the numeral 28 in FIG. 4. Just the opposite is true in the bottom view of FIG. 5.

Figure 5:
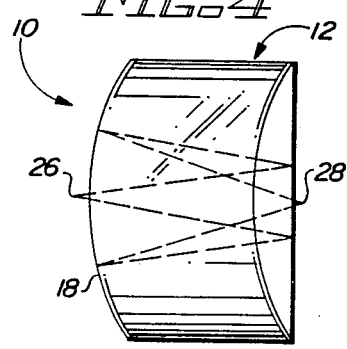
FIG. 5 is a schematic bottom perspective illustrating another view of the path of the two light beams of FIG. 4 through the lens of FIG. 1.

The effect of this focusing scheme is to approximately halve the divergence angle of the light beam in the side view plane of FIG. 4 and to approximately double the divergence angle of the light beam in the bottom view plane of FIG. 5. The focal lengths of the two mirrors 18 & 20 are independent of each other, so that if, as in the case of some laser diodes, the light source appears to originate at two different points when viewed in two planes perpendicular to the axis of the beam and to each other, the focal lengths of the two cylindrical mirrors can be tailored to exactly compensate for the astigmatism of the source. This makes it possible to focus an astigmatic source such as 26 to a single point 28. It also makes it possible to convert a light beam that diverges four times as much in one direction as it does in the perpendicular direction into a beam approximately circular in cross-section.

Lens 10 can be molded, cast or otherwise fabricated in a single operation, except for the subsequent mirroring of ends 14 and 16 by a conventional coating deposition procedure. Alternatively lens 10 can be formed by grinding the flat opposite ends of a cylinder into their ultimate configurations, then mirroring those ends. Lens 10 is inexpensive, durable and efficient in focusing a light beam and correcting astigmatism.

An astigmatic laser diode—generated beam of light can be corrected for astigmatism through the use of lens 10 so that it can be made useful in applications such as surveying where a high degree of collimation is required. Lens 10, because of its compact monolithic nature, also facilitates miniaturization of a cylindrical optical train. Lens 10 can make highly elliptical beams less elliptical, for more efficient coupling to fibers of small numerical aperture. When lens 10 is hermetically sealed to a diode package using solder glass, the index of refraction of the material near the outer periphery of lens 10 has little effect on the performance of lens 10. Other applications for the lens of the present invention have been previously described.

FIG. 6

Figure 6:
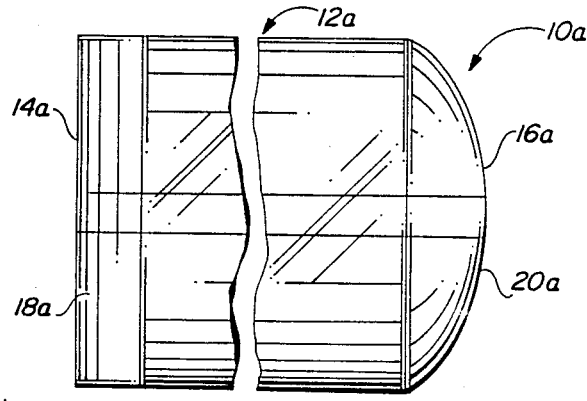
FIG. 6 is a schematic fragmentary side elevation of a second preferred embodiment of the improved lens of the present invention; and, FIG. 7 is a schematic perspective view of a third preferred embodiment of the improved lens of the present invention.

A second preferred embodiment of the improved focusing lens of the present invention is schematically depicted in FIG. 6. Thus, lens 10a is shown. Components thereof similar to those of lens 10 bear the same numerals but are succeeded by the letter "a".

Lens 10a is substantially identical to lens 10, except that mirror 20a is in the configuration of a segment of a sphere, rather than a segment of a circular cylinder. The result is that lens 10a can make a larger correction with respect to astigmatism than can lens 10, but provides a smaller change in light beam cross-section shape than is provided by lens 10.

FIG. 7

Figure 7:
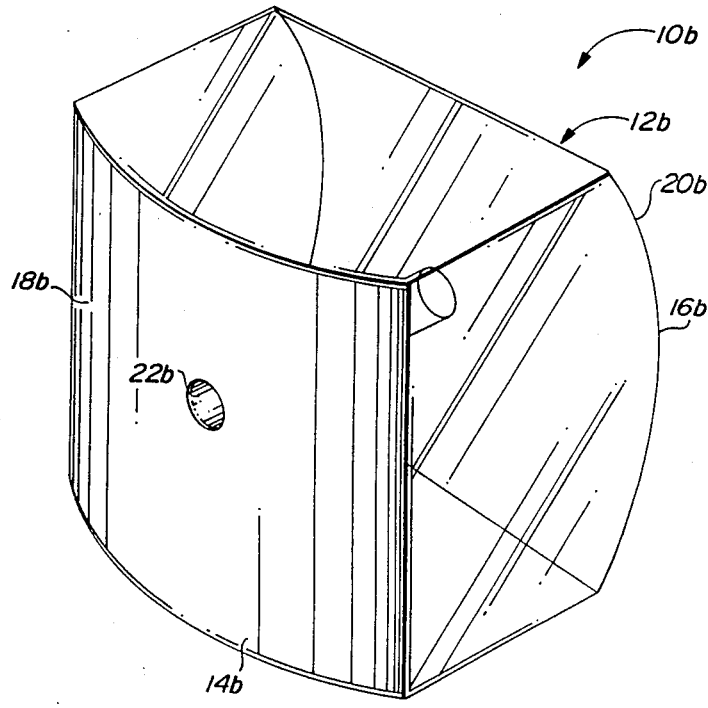

A third preferred embodiment of the improved focusing lens of the present invention is schematically depicted in FIG. 7. Thus, lens 10b is shown. Components thereof similar to those of lens 10 bear the same numerals but are succeeded by the letter "b".

Lens 10b is substantially identical to lens 10 except that body 12b is not a cylinder but is a six-sided block, with a square vertical cross-section and with ends 14b and 16b in the configuration of segments of circular cylinders, with their axes perpendicular to each other, as with lens 10. Lens 10b has substantially the features, advantages and performance of lens 10.

Various other modifications, changes, alterations and additions can be made in the improved lens, its components and parameters. All such modifications, changes, alterations and additions as are within the scope of the appended claims form part of the present invention.

What is claimed is:

1. An improved focusing mirror lens, said lens comprising a transparent monolithic lens body having a light entrance end and an opposite light exit end, a first focusing mirror on said entrance end and a second focusing mirror on said exit end, one of said focusing mirrors having the configuration of a segment of a circular cylinder while the other said mirror has the configuration of a segment of either a circular cylinder or a sphere, said mirrors being reflective coatings on said lens body at said entrance end and said exit end, said mirrors defining uncoated light-transmitting pupils aligned along the longitudinal axis of said lens body.

2. The improved lens of claim 1 wherein said lens body is generally cylindrical.

3. The improved lens of claim 1 wherein said lens body is a non-cylindrical block with flat sides, top and bottom.

4. The improved lens of claim 1 wherein both said focusing mirrors have the configuration of a segment of a circular cylinder and wherein the axes of said segments are perpendicular to each other.

5. The improved lens of claim 1 where in one of said mirrors has the configuration of a segment of a sphere.

6. The improved lens of claim 1 wherein said lens body is glass and said mirror coatings are reflective silver deposited on the exterior of said lens body.

7. The improved lens of claim 1 wherein said mirror coatings are a stack of sequentially deposited clear layers of dielectric material.

8. The improved lens of claim 7 wherein said layers have differing refractive indices, each said layer's thickness being a precise multiple of the wavelength of the radiation to be reflected, said mirrors substantially totally reflecting the output wavelength of a preselected diode.

9. The improved lens of claim 1 wherein said lens body is transparent corundum.

10. The improved lens of claim 5 wherein said pupils have an antireflective protective film thereon.

* * * * *